US011907673B1

(12) United States Patent
Hao et al.

(10) Patent No.: US 11,907,673 B1
(45) Date of Patent: Feb. 20, 2024

(54) ENHANCING CHATBOT RECOGNITION OF USER INTENT THROUGH GRAPH ANALYSIS

(71) Applicant: FMR LLC, Boston, MA (US)

(72) Inventors: Hua Hao, Dalian (CN); Chen Bi, Dalian (CN); Tieyi Guo, Frisco, TX (US); Byung Chun, Kingston, MA (US); Wenbin Ren, Dalian (CN); Hao Fu, Dalian (CN); Pengrui Sun, Dalian (CN)

(73) Assignee: FMR, LLC, Boston, MA (US)

( * ) Notice: Subject to any disclaimer, the term of this patent is extended or adjusted under 35 U.S.C. 154(b) by 0 days.

(21) Appl. No.: 18/115,496

(22) Filed: Feb. 28, 2023

(51) Int. Cl.
  *G06F 15/16* (2006.01)
  *G06F 40/40* (2020.01)
  *H04L 51/02* (2022.01)
  *G06F 16/35* (2019.01)

(52) U.S. Cl.
  CPC .............. *G06F 40/40* (2020.01); *G06F 16/35* (2019.01); *H04L 51/02* (2013.01)

(58) Field of Classification Search
  None
  See application file for complete search history.

(56) References Cited

U.S. PATENT DOCUMENTS

| | | | |
|---|---|---|---|
| 10,957,311 B2 * | 3/2021 | Solomon | G06T 7/248 |
| 11,042,800 B2 * | 6/2021 | Mars | G06N 3/045 |
| 2019/0182382 A1 * | 6/2019 | Mazza | G10L 15/26 |
| 2020/0004813 A1 * | 1/2020 | Galitsky | G06F 40/30 |
| 2020/0057946 A1 * | 2/2020 | Singaraju | G06N 5/022 |
| 2020/0286463 A1 * | 9/2020 | Galitsky | G06F 16/35 |
| 2020/0356605 A1 * | 11/2020 | Galitsky | G06F 40/289 |
| 2020/0380964 A1 * | 12/2020 | Kang | G06F 40/35 |
| 2021/0012245 A1 * | 1/2021 | Singaraju | H04L 51/04 |
| 2021/0103574 A1 * | 4/2021 | Belezko | G06N 20/00 |
| 2022/0321511 A1 * | 10/2022 | Hansmann | H04L 51/046 |

FOREIGN PATENT DOCUMENTS

WO    WO-2019103738 A1 * 5/2019 ....... G06F 16/90332

\* cited by examiner

*Primary Examiner* — Phyllis A Book
(74) *Attorney, Agent, or Firm* — Cesari and McKenna, LLP

(57) ABSTRACT

Methods and apparatuses are described for enhancing chatbot recognition of user intent through graph analysis. A computing device classifies user messages associated with a chat session as either comprehensible user messages that are mapped to a user intent or incomprehensible utterances that are not mapped to a user intent. The computing device arranges the comprehensible messages into first clusters and arranges the incomprehensible messages into second clusters. The computing device generates a first sub-graph for each first cluster and generates a second sub-graph for each second cluster. The computing device calculates a graph kernel matrix using the sub-graphs and trains a classification model using the graph kernel matrix. The computing device executes the trained classification model using the graph kernel matrix as input to generate a predicted intent identifier for the incomprehensible messages.

24 Claims, 4 Drawing Sheets

ENHANCING CHATBOT RECOGNITION OF USER INTENT THROUGH GRAPH ANALYSIS

TECHNICAL FIELD

This application relates generally to methods and apparatuses, including computer program products, for enhancing chatbot recognition of user intent through graph analysis.

BACKGROUND

A chatbot is a computer software application and/or computing system that communicates with users at client computing devices through an exchange of text messages during conversations. Chatbots are commonly used in different areas of daily life with high efficiency and low costs, such as providing weather forecasts, giving business advice, responding to queries, and the like. Generally, the technology behind a chatbot comprises a Natural Language Understanding (NLU) algorithm that captures user input messages, parses the messages and attempt to discern the intent or reason for the user's messages. Certain types of chatbots are task-oriented, meaning that the chatbot receives a user message, recognizes one or more user intents and/or entities of the message, retrieves information that is related to or otherwise responsive to the message, and generates a response message that is provided to the user. In some cases, chatbots leverage advanced machine learning technology—such as intent recognition models—in order to comprehend the intent behind a user's message more accurately or efficiently. Generally, an intent recognition model attempts to map a user's message to a particular user intent that is defined in the chatbot, where the intent provides the chatbot with a starting point from which to respond to the user message.

Although a chatbot can be highly useful for business owners (e.g., by reducing or eliminating the need for live customer service staff, more quickly responding to user queries, etc.), sometimes the chatbot may be unable to parse or understand a particular message from an end user (a so-called unrecognized or incomprehensible message). As a result, some end users may stop interacting with chatbot systems due to experiencing these difficulties with the chatbot understanding the user's messages and providing unexpected or undesirable responses. For example, when a chatbot does not comprehend a user's message, the chatbot may simply respond with a default message such as "Sorry, I don't understand what you mean by that," or continually asks the user to repeat the message or state the message in a different way. Such activity leads to user dissatisfaction with the chatbot technology.

In order to avoid this problem, developers try to improve the chatbot performance by re-training the underlying intent recognition model so that the model better understands the intent behind the requests/messages originating from end users. As can be appreciated, upon closer inspection, certain unrecognized messages should actually be mapped to existing user intents while other unrecognized messages should be mapped to new user intents. The former group of unrecognized yet recognizable messages can be absorbed into the model training dataset to help re-train and improve the existing intent classifier model. The latter group of unrecognizable messages must be reviewed by the developers to figure out new intents to which the unrecognizable messages should be mapped.

SUMMARY

Therefore, what is needed are methods and systems for automatically analyzing unrecognized or incomprehensible user messages in order to determine a likely user intent and dynamically retrain chatbot applications to understand the user intent behind the incomprehensible messages. The techniques described herein advantageously utilize a plurality of advanced machine learning classification algorithms to map unrecognized user messages to existing user intents and generate training data that is then re-incorporated into, e.g., a natural language processing (NLP) model used by the chatbot to conduct communication sessions with one or more end users.

The invention, in one aspect, features a computer system for enhancing chatbot recognition of user intent through graph analysis. The system comprises a computing device having a memory that stores computer-executable instructions and a processor that executes the computer-executable instructions. The computing device classifies each of a plurality of user messages associated with a chat session between a user of a remote computing device and a chatbot application as either comprehensible user messages that are mapped to a user intent or incomprehensible utterances that are not mapped to a user intent. The computing device arranges the comprehensible user messages into a first plurality of clusters and arranges the incomprehensible user messages into a second plurality of clusters. The computing device generates a first sub-graph data structure for each cluster in the first plurality of clusters and generates a second sub-graph data structure for each cluster in the second plurality of clusters. The computing device calculates a graph kernel matrix using the first sub-graph data structures and the second sub-graph data structures. The computing device trains a classification model using the graph kernel matrix, the trained classification model configured to predict an intent identifier for an input graph kernel matrix. The computing device executes the trained classification model using the graph kernel matrix as input to generate a predicted intent identifier for one or more of the incomprehensible user messages.

The invention, in another aspect, features a computerized method of enhancing chatbot recognition of user intent through graph analysis. A computing device classifies each of a plurality of user messages associated with a chat session between a user of a remote computing device and a chatbot application as either comprehensible user messages that are mapped to a user intent or incomprehensible utterances that are not mapped to a user intent. The computing device arranges the comprehensible user messages into a first plurality of clusters and arranges the incomprehensible user messages into a second plurality of clusters. The computing device generates a first sub-graph data structure for each cluster in the first plurality of clusters and generates a second sub-graph data structure for each cluster in the second plurality of clusters. The computing device calculates a graph kernel matrix using the first sub-graph data structures and the second sub-graph data structures. The computing device trains a classification model using the graph kernel matrix, the trained classification model configured to predict an intent identifier for an input graph kernel matrix. The computing device executes the trained classification model using the graph kernel matrix as input to generate a predicted intent identifier for one or more of the incomprehensible user messages.

Any of the above aspects can include one or more of the following features. In some embodiments, classifying each of the plurality of user messages as either a comprehensible user message or an incomprehensible user message comprises, for each user message: determining whether the user message can be mapped to an existing user intent; classifying the user message as a comprehensible user message when the user message can be mapped to an existing user intent; and classifying the user message as an incomprehensible user message when the user message cannot be mapped to an existing user intent. In some embodiments, arranging the comprehensible user messages into a first plurality of clusters and arranging the incomprehensible user messages into a second plurality of clusters comprises: preprocessing the comprehensible user messages and the incomprehensible user messages; transforming each comprehensible user message into a multidimensional vector and transforming each incomprehensible user message into a multidimensional vector; assigning each comprehensible user message vector to a cluster of the first plurality of clusters based upon all comprehensible user messages that are mapped to a same intent as the comprehensible user message; and assigning the incomprehensible user message vectors to a cluster of the second plurality of user messages.

In some embodiments, each sub-graph data structure is based upon a plurality of keywords from the user messages associated with the corresponding cluster. In some embodiments, the classification model comprises a support vector machine (SVM). In some embodiments, the server computing device determines an existing user intent associated with the predicted intent identifier and assigns the determined user intent to the corresponding incomprehensible user message.

The invention, in another aspect, features a computer system for enhancing chatbot recognition of user intent through graph analysis. The system comprises a computing device having a memory that stores computer-executable instructions and a processor that executes the computer-executable instructions. The computing device classifies each of a plurality of user messages associated with a chat session between a user of a remote computing device and a chatbot application as either comprehensible user messages that are mapped to a user intent or incomprehensible utterances that are not mapped to a user intent. The computing device generates a contextual embedding for each of the plurality of user messages. The computing device determines an intent classification score for each contextual embedding using a classification model. The computing device calculates a similarity measure between each contextual embedding and one or more embeddings generated from user messages in a chat log. The computing device matches each of the incomprehensible user messages to one or more comprehensible user messages using a pattern matching algorithm. The computing device generates a predicted intent score for each incomprehensible user message based upon the intent classification score, the similarity measure, and the matched comprehensible user messages. The computing device determines one or more existing user intents based upon the predicted intent score and assigns the one or more existing user intents to the corresponding incomprehensible user message.

The invention, in another aspect, features a computerized method of enhancing chatbot recognition of user intent through graph analysis. A computing device classifies each of a plurality of user messages associated with a chat session between a user of a remote computing device and a chatbot application as either comprehensible user messages that are mapped to a user intent or incomprehensible utterances that are not mapped to a user intent. The computing device generates a contextual embedding for each of the plurality of user messages. The computing device determines an intent classification score for each contextual embedding using a classification model. The computing device calculates a similarity measure between each contextual embedding and one or more embeddings generated from user messages in a chat log. The computing device matches each of the incomprehensible user messages to one or more comprehensible user messages using a pattern matching algorithm. The computing device generates a predicted intent score for each incomprehensible user message based upon the intent classification score, the similarity measure, and the matched comprehensible user messages. The computing device determines one or more existing user intents based upon the predicted intent score and assigns the one or more existing user intents to the corresponding incomprehensible user message.

Any of the above aspects can include one or more of the following features. In some embodiments, generating a contextual embedding for each of the plurality of user messages comprises executing a contextual embedding model on each of the plurality of user messages to generate a multidimensional vector comprising one or more features of the user message. In some embodiments, the contextual embedding model comprises a bidirectional encoder representations from transformers (BERT) model.

In some embodiments, the computing device reduces the number of dimensions in the contextual embedding prior to determining the intent classification score. In some embodiments, the computing device clusters the contextual embeddings and determines the intent classification score for each contextual embedding cluster. In some embodiments, the similarity measure between each contextual embedding and the one or more embeddings generated from the user messages in the chat log is determined using a nearest neighbor algorithm.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
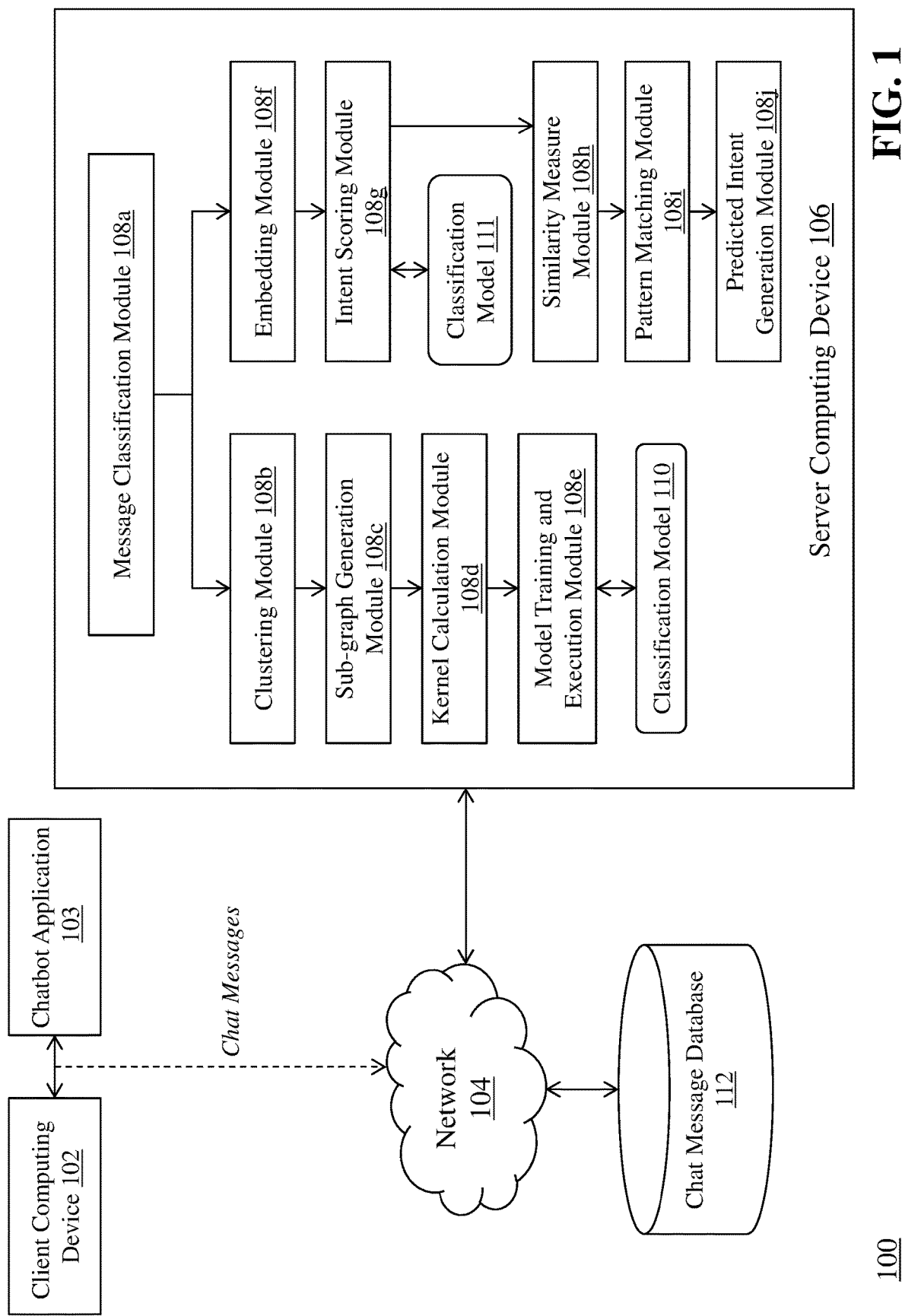
FIG. 1 is a block diagram of a system for enhancing chatbot recognition of user intent through graph analysis.

FIG. 1 is a block diagram of a system 100 for enhancing chatbot recognition of user intent through graph analysis.

System 100 includes client computing device 102, chatbot application 103, communication network 104, server computing device 106 that includes message classification module 108a, clustering module 108b, sub-graph generation module 108c, kernel calculation module 108d, model training and execution module 108e, embedding module 108f, intent scoring module 108g, similarity measure module 108h, pattern matching module 108i, predicted intent generation module 108j, and classification model 110. System further includes chat message database 112.

Client computing device 102 connects to the communications network 104 in order to establish a chat-based communication session with chatbot application 103. Client computing device 102 can be coupled to a display device (not shown), such as a monitor, display panel, or screen. For example, client computing device 102 can provide a graphical user interface (GUI) via the display device to a user of the corresponding device that presents output resulting from the methods and systems described herein and receives input from the user for further processing. Exemplary client computing devices 102 include but are not limited to desktop computers, laptop computers, tablets, mobile devices, smartphones, smart watches, Internet-of-Things (IoT) devices, and internet appliances. It should be appreciated that other types of client computing devices that are capable of connecting to the components of the system 100 can be used without departing from the scope of invention. Although FIG. 1 depicts a single client computing device 102, it should be appreciated that the system 100 can include any number of client computing devices.

Chatbot application 103 comprises an automated conversation service software application executing on a computing device and being configured to automatically interact with a user at client computing device 102 in order to exchange textual messages for gathering information and/or responding to inquiries. An exemplary conversation service application can be based upon a natural language processing (NLP) architecture which intelligently parses text messages received from client computing device 102 to understand the semantics and context of the message. Chat messages exchanged between client computing device 102 and chatbot application 103 are stored in chat messages database 112.

Communication network 104 enables chat messages to be captured from a chat session between client computing device 102 and chatbot 103 for storage and processing as described herein. In addition, communication network 104 enables server computing device 106 to communicate with database 112 and one or more other remote computing devices (not shown). In some embodiments, client computing device 102 is similarly connected to network 104 in order to communicate with server computing device 106. Network 104 is typically a wide area network, such as the Internet and/or a cellular network. In some embodiments, network 104 is comprised of several discrete networks and/or sub-networks (e.g., cellular to Internet).

Server computing device 106 is a device including specialized hardware and/or software modules that execute on a processor and interact with memory modules of the server computing device 106, to receive data from other components of the system 100, transmit data to other components of the system 100, and perform functions for enhancing chatbot recognition of user intent through graph analysis as described herein. Server computing device 106 includes several computing modules 108a-108i and classification model 110 that execute on one or more processors of server computing device 106. In some embodiments, modules 108a-108i and classification model 110 are specialized sets of computer software instructions programmed onto one or more dedicated processors in the server computing device 106 and can include specifically-designated memory locations and/or registers for executing the specialized computer software instructions.

Although modules 108a-108i and classification model 110 are shown in FIG. 1 as executing within the same server computing device 106, in some embodiments the functionality of modules 108a-108i and classification model 110 can be distributed among a plurality of server computing devices. As shown in FIG. 1, server computing device 106 enables modules 108a-108i and classification model 110 to communicate with each other in order to exchange data for the purpose of performing the described functions. It should be appreciated that any number of computing devices, arranged in a variety of architectures, resources, and configurations (e.g., cluster computing, virtual computing, cloud computing) can be used without departing from the scope of the invention. The exemplary functionality of modules 108a-108i and classification model 110 is described in detail below.

Chat message database 112 is located on a single computing device (or in some embodiments, on a plurality of computing devices) coupled to client computing device 102 and/or chatbot 103, and to server computing device 106, and is configured to receive, generate, and store specific segments of data relating to the process of enhancing chatbot recognition of user intent through graph analysis as described herein. In some embodiments, all or a portion of database 112 can be integrated with server computing device 106 or be located on a separate computing device or devices. Database 112 can be configured to store portions of data used by the other components of the system 100, as will be described in greater detail below. In some embodiments, database 112 is located in a cloud storage infrastructure comprising one or more nodes accessible by server computing device 106.

System 100 can utilize one or more different methodologies in order to enhance chatbot recognition of user intent. The first methodology described herein uses graph analysis to predict user intent associated incomprehensible user messages by re-training a classification model with a graph kernel matrix. The second methodology described herein uses classification and pattern matching for user messages to predict intent.

Predicting User Intent Via a Graph Kernel Matrix

Figure 2:
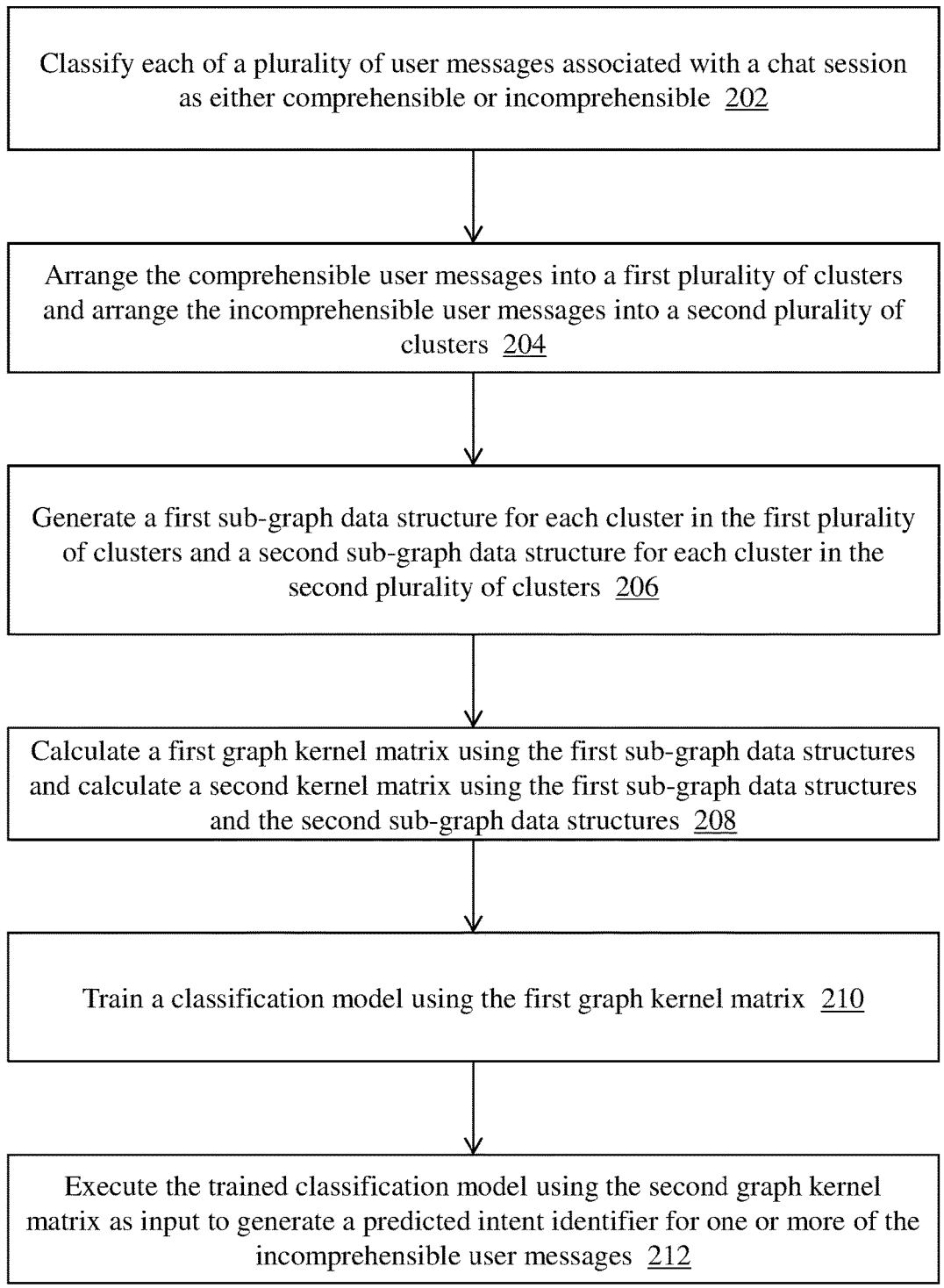
FIG. 2 is a flow diagram of a computerized method of enhancing chatbot recognition of user intent through graph analysis.

FIG. 2 is a flow diagram of a computerized method 200 of enhancing chatbot recognition of user intent through graph analysis, using system 100 of FIG. 1. Message classification module 108a retrieves a plurality of user messages from one or more chat sessions, including both comprehensible and incomprehensible user messages, from database 112. In this context, a comprehensible (or recognizable) user message is a message that the chatbot is able to map to one or more existing user intents while an incomprehensible (or unrecognizable) user message is a message that the chatbot cannot map to any existing user intents.

In some embodiments, upon retrieving the user messages, message classification module 108a can perform one or more preprocessing steps on the user messages in order to prepare the user messages for classification as comprehensible or incomprehensible. Exemplary preprocessing steps include, but are not limited to: identifying duplicate messages, filtering out stopwords and/or domain-specific words, removing punctuation, and the like. In some embodiments, module 108a can also remove user messages that are shorter than a predetermined length and/or number of words.

After preprocessing the user messages, message classification module 108a classifies (step 202) each of the user messages as either comprehensible or incomprehensible. In some embodiments, module 108a determines whether each user message has been associated with a user intent by chatbot application 103. As can be appreciated, during the chat session between client computing device 102 and chatbot application 103, the chatbot application can receive one or more user messages from device 102 and perform processing to determine whether the user messages can be associated with or otherwise linked to an existing user intent. For user messages that are associated with an intent, module 108a classifies these messages as comprehensible and separates the comprehensible messages and their related user intents to be used as training data for the classification model 110 (described later in the specification). For user messages that are not associated with an intent, module 108a classifies these messages as incomprehensible.

Clustering module 108b receives the comprehensible messages and related user intents from message classification module 108a. Clustering module 108b arranges (step 204) the comprehensible user messages into a first plurality of clusters. As part of the clustering process, clustering module 108b first converts each comprehensible user message into a multidimensional vector so that the user message is in a form that can be processed by classification model 110. As can be appreciated, machine learning models (such as model 110) generally cannot process textual data like the user messages. Therefore, the user messages must be transformed into numerical data (i.e., multidimensional vectors or matrices). To achieve this goal, clustering module 108b utilizes a fine-tuning model approach which introduces minimal task-specific parameters and can be trained on the downstream tasks by fine tuning the pre-trained parameters. In some embodiments, module 108b converts the user messages into vectors that can be interpreted by a Bidirectional Encoder Representations from Transformers (BERT) implementation (as described in J. Devlin et al., "BERT: Pre-training of Deep Bidirectional Transformers for Language Understanding," arXiv:1810.04805 [cs.CL] 24 May 2019, available at arxiv.org/pdf/1810.04805, which is incorporated herein by reference). BERT is an NLP model proposed by Google in 2018, which learns a word's different semantic information based on its left and right context and obtains token level and sentence level representation by using Masked Language Model and next sentence prediction. Clustering module 108b uses BERT to generate sentence-level representation (i.e., a vector v for each sentence, or user message). In one embodiment, each user message is represented as:

$$v \in R^{128}$$

where v is the vector with 128 dimensions (i.e., after representation using BERT-Tiny (available for download from github.com/google-research/bert).

In some embodiments, clustering module 108b further reduces the dimensionality of the vectors prior to further processing. As can be understood, high-dimensional data is difficult for classification models to analyze. Therefore, dimension reduction is a common method to solve this problem in machine learning. Dimension reduction transforms data from a high-dimensional space into a low-dimensional space, where the low-dimensional representation retains some meaningful properties of the original data, ideally close to its intrinsic dimension(s). Clustering module 108b utilizes Principal Component Analysis (PCA) (as described in H. Hotelling, "Analysis of a complex of statistical variables into principal components," *Journal of Educational Psychology*, 24(6), 417-441 (1933)), which is a statistical procedure that uses an orthogonal transformation to convert a set of observations of possibly correlated variables into a set of values of linearly uncorrelated variables called principal components. This makes sure that the data after dimension reduction still contains the most important information of the larger dimensional data. For example, if there are n observations with p variables, then the number of distinct principal components is min (n−1, p). This transformation is defined in such a way that the first principal component has the largest possible variance (that is, accounts for as much of the variability in the data as possible), and each succeeding component in turn has the highest variance possible under the constraint that it is orthogonal to the preceding components. The resulting vectors are an uncorrelated orthogonal basis set. In some embodiments, clustering module 108b can reduce the dimensionality of vector v from 128 components to 64 components.

Then, module 108b arranges the vectors corresponding to comprehensible user messages into a first plurality of clusters. In some embodiments, module 108b selects a predetermined number of frequently-used intents (e.g., 64 intents) and the remaining less-frequently-used intents are considered background intents. Therefore, module 108b uses 65 intents as labels for the clustering process (i.e., 64 labels for the 64 frequently used intents and 1 label for all other intents). For each label, the corresponding user messages for that label are clustered into nine different clusters—so that the training data comprises 9 * 65 clusters corresponding to the comprehensible user messages. Clustering module 108b also arranges (step 204) the incomprehensible user messages into a second plurality of clusters. For the incomprehensible user messages, module 108b assigns the messages to a predetermined number of clusters (e.g., 200 clusters) and the clusters of the incomprehensible user messages are used as input to the classification model 110 (after training on the comprehensible training dataset described above) for prediction of user intent.

Generally, clustering is an unsupervised technique in which a set of similar points is grouped together to form a cluster. For points in the same cluster, the similarity is high and for points in different clusters, the similarity is low. As noted above, each user message is represented as a multidimensional vector v after feature extraction and dimension reduction and each vector v can be considered as a point in a multidimensional vector space. Clustering module 108b uses K-Means clustering (as described in J. MacQueen, "Some Methods for Classification and Analysis of Multivariate Observations," Proceedings of the Fifth Berkeley Symposium on Mathematical Statistics and Probability, Vol. 1. No. 14. (1967)) to iteratively relocate the cluster centers by computing the mean of a cluster. This methodology first randomly assigns each point to K clusters. Then, the distance between each point and the cluster center is calculated, and each point is assigned to the nearest cluster center. After all points are assigned, K-Means calculates each cluster's mean based on the points assigned to the cluster and relocates the cluster center to the mean. The process is executed cyclically until the cluster centers no longer change or the distance change is less than a threshold.

Once the user messages have been clustered by module 108b, sub-graph generation module 108c generates (step 206) a first sub-graph data structure for each cluster in the first plurality of clusters (i.e., the clusters corresponding to the comprehensible user messages) and generates a second sub-graph data structure for each cluster in the second plurality of clusters (i.e., the clusters corresponding to the incomprehensible user messages). In some embodiments, module 108c provides the vector clusters as input to a process that provides multi-stage analysis of text corpora (such as the Saffron™ open source software tool, available from saffron.insight-centre.org/about/and github.com/insight-centre/saffron). Sub-graph generation module 108c uses Saffron to obtain each cluster's top-k keywords and taxonomy. Then, module 108c extracts a sub-graph data structure for each cluster based upon the top-k keywords and traverse depth, and labels each edge of the cluster with its depth. In one example, module 108c uses different parameters for top-k keywords and traverse depth when generating the clusters—e.g., for the comprehensible user message clusters, module 108c can set the top-k keywords to 10 and the traverse depth to 2; while for the incomprehensible user message clusters, module 108c can set the top-k keywords to 30 and the traverse depth to 3.

Once the sub-graph data structures are generated for each cluster, kernel calculation module 108d calculates (step 208) a first graph kernel matrix using the first sub-graph data structures (i.e., for the comprehensible user message clusters) and a second graph kernel matrix using the first sub-graph data structures and the second sub-graph data structures (i.e., for the incomprehensible user message clusters). In some embodiments, module 108d preprocesses the first sub-graph data structures and the second sub-graph data structures by transforming each sub-graph into structured data based upon the extracted node(s) and edge(s) for the sub-graph. In some embodiments, module 108d also removes one or more low-quality sub-graph data structures (e.g., where a sub-graph only contains a few nodes).

As can be appreciated, in mathematics if points are linearly inseparable, then the points will be linearly separable after projecting them to a high-dimensional space as long as the dimensionality is high enough. For example, a commonly used classifier is a Support Vector Machine (SVM) (as described in C. Cortes and V. Vapnik, "Support-vector networks," Machine Learning 20.3 (1995): 273-297). For SVM, if points are linearly inseparable in the raw space, the performance of the classifier is suboptimal, but upon projecting these points to a high-dimensional space to make them linearly separable, the time complexity increases dramatically and it is also difficult to know how high the dimensionality is. Advantageously, module 108d applies a Kernel SVM, which uses a kernel approach to solve this problem. Kernel SVM defines a kernel function which projects points in a low-dimensional space to a high-dimensional space and the dot product in the high-dimensional space could be represented by dot product in the low-dimensional space. Through this approach, linearly inseparable points transform to linearly separable points and one does not need to know the dimension of the high-dimensional space nor perform high-dimensional operations. As mentioned above, the dot product and the kernel function are the keys for Kernel SVM. Generally, a dot product is the similarity of two points—module 108d determines a dot product (or similarity) of the sub-graphs. Thus, a graph kernel is a way to compare graph-substructures via kernels. Module 108d uses shortest-path kernels (as described in K. Borgwardt and H. Kriegel, "Shortest-path kernels on graphs," $5^{th}$ IEEE International Conference on Data Mining (ICDM'05), November 2005, pp. 74-81), which measures similarity based on shortest paths in graphs and is computable in polynomial time. Module 108d also utilizes the GraKeL python library (as described in G. Siglidis, et al., "GraKeL: A Graph Kernel Library in Python," Journal of Machine Learning Research 21.54 (2020): 1-5) to implement shortest-path kernels.

Module 108d calculates the graph kernel matrix for the first sub-graph data structures (training data), in which $ki_{i,j}$ is the graph kernel for cluster i and cluster j. For the second sub-graph data structures (incomprehensible sub-graphs), the kernel matrix y is calculated based on the first set of sub-graph data structures. The row for this kernel matrix y is the second sub-graph data structures and the column is the first sub-graph data structures. As can be appreciated, if there are N sub-graphs generated from the second plurality of clusters and M sub-graphs generated from the first plurality of clusters, the dimensionality of the graph kernel matrix y is N×M.

Next, model training and execution module 108e uses the first graph kernel matrix k from the training data to train (step 210) classification model 110. In some embodiments, classification model 110 is a Kernel SVM classifier. Module 108e trains classification model 110 using the first graph kernel matrix (that is generated from comprehensible user messages) to be able to predict user intents for a subsequent input graph kernel matrix that is based upon incomprehensible user messages. After classification model 110 is trained on the first graph kernel matrix k, model training and execution module 108e executes (step 212) the trained classification model using the second graph kernel matrix y as input to generate a predicted intent identifier for one or more of the incomprehensible user messages.

Figure 3:
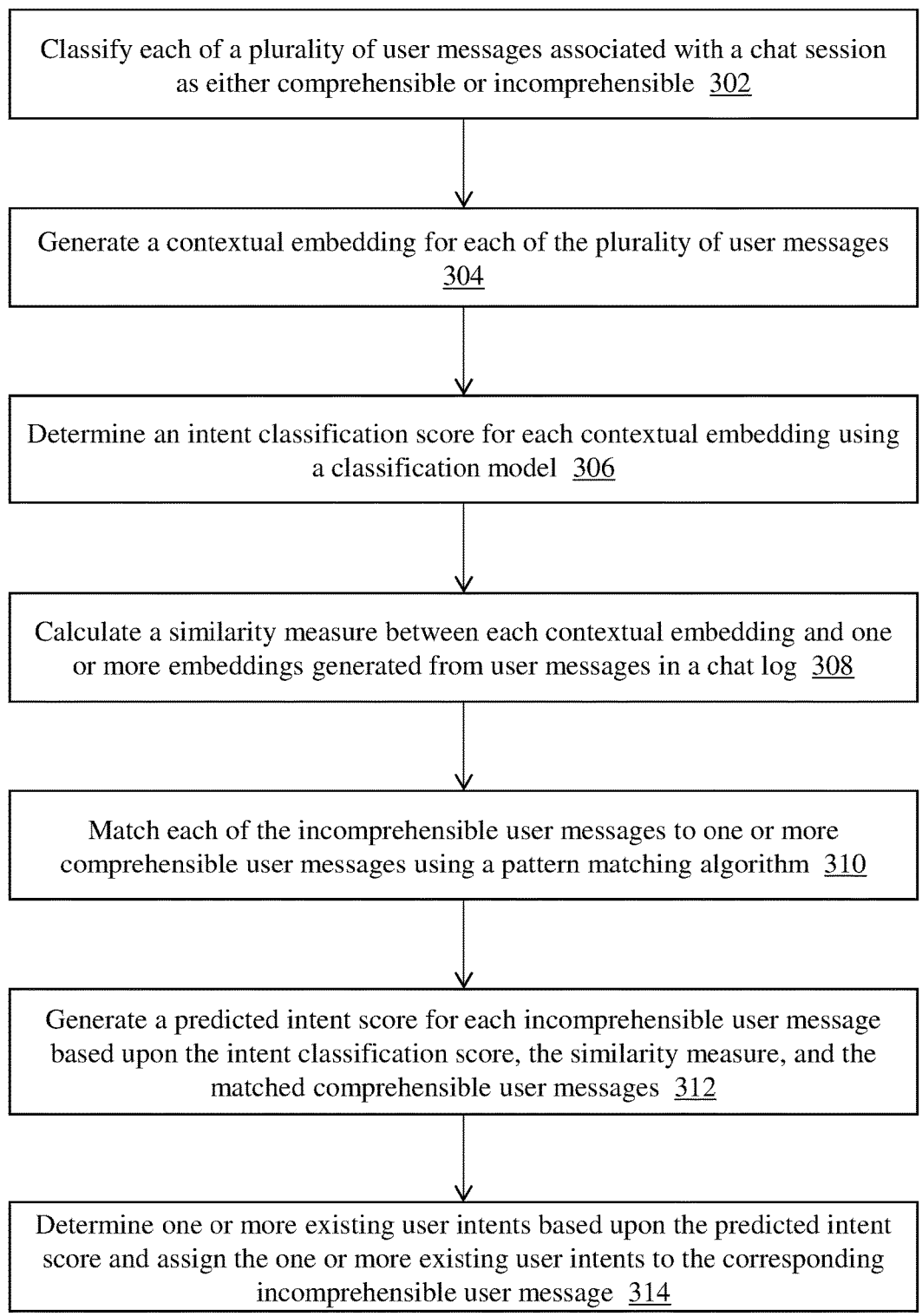
FIG. 3 is a flow diagram of a computerized method of enhancing chatbot recognition of user intent through classification, similarity measures, and pattern matching.

After execution of the trained model 110 on the graph kernel matrix y associated with the incomprehensible user messages, model training and execution module 108e determines one or more existing user intents that apply to one or more of the incomprehensible user messages—thereby converting the incomprehensible messages to comprehensible messages. In some embodiments, module 108e can use the learned intents to re-train model 110. Also, module 108e can provide the learned intent information to chatbot application 103—so that chatbot 103 is able to recognize the same or similar user messages as comprehensible in the future, thereby providing an improved processing and responsiveness to user messages during a chat session. For example, module 108e can store the learned user intents in database 112 for retrieval by chatbot application 103 for use in one or more software modules of chatbot 103 for natural language processing (NLP), chat workflow processing, intent determination, and the like Predicting User Intent Via Classification and Pattern Matching As mentioned previously, system 100 can implement a second methodology which uses classification and pattern matching for comprehensible and incomprehensible user messages to predict intent. FIG. 3 is a flow diagram of a computerized method 300 of enhancing chatbot recognition of user intent through classification, similarity measures, and pattern matching, using system 100 of FIG. 1. Message classification module 108a retrieves a plurality of user messages from one or more chat sessions, including both comprehensible and incomprehensible user messages, from database 112 and preprocesses the user messages as described above with respect to FIG. 2.

After preprocessing the user messages, message classification module 108a classifies (step 302) each of the user messages as either comprehensible or incomprehensible. In some embodiments, module 108a determines whether each user message has been associated with a user intent by chatbot application 103. As can be appreciated, during the chat session between client computing device 102 and chatbot application 103, the chatbot application can receive one or more user messages from device 102 and perform processing to determine whether the user messages can be associated with or otherwise linked to an existing user intent. For user messages that are associated with an intent, module 108a classifies these messages as comprehensible. For user messages that are not associated with an intent, module 108a classifies these messages as incomprehensible.

Next, embedding module 108f generates (step 304) a contextual embedding for each of the plurality of comprehensible user messages and a contextual embedding for each of the plurality of incomprehensible user messages. In some embodiments, module 108f generates the contextual embeddings using, e.g., a deep learning embedding technique which maps natural language into a continuous vector space whose distribution matches with the semantic affine. An exemplary algorithm that can be used by module 108f for generating the contextual embedding for each user message is described in N. Reimers and I. Gurevych, "Sentence-BERT: Sentence Embeddings using Siamese BERT-Networks," Proceedings of the 2019 *Conference on Empirical Methods in Natural Language Processing and the $9^{th}$ International Joint Conference on Natural Language Processing* (EMNLP-IJCNLP), November 2019, pages 3982-3992, Hong Kong, China, which is incorporated herein by reference. As can be appreciated, compared with a key-phrase based approach, deep learning embedding has several advantages: robust performance for sentiment searching, linear memory cost, and easy maintenance. Once the contextual embeddings are generated, module 108f can in some embodiments perform a feature selection process to identify key features of the user messages/contextual embeddings that are most important for determining user intent and reduce the dimensionality of the contextual embeddings based upon the key features for, e.g., faster training, reduced prediction time and minimizing memory requirements.

Once the contextual embeddings have been generated, intent scoring module 108g determines (step 306) an intent classification score for each contextual embedding using classification model 111. In some embodiments, module 108g clusters the contextual embeddings and executes classification model 111 on the clustered embeddings to generate an intent classification score for each cluster, where the intent classification score corresponds to a likelihood of whether the user messages for the cluster of embeddings are associated with one or more user intents. As can be appreciated, the clustering step is optional and can promote improved efficiency and performance in the classification process. In some embodiments, classification model 111 is a decision-tree-based gradient boosting algorithm (such as XGBoost, described at xgboost.readthedocs.io/en/stable/) stacked with a long short-term memory (LSTM) neural network. In some instances, for each user intent there may be a limited amount of known comprehensible user messages—which leads to an imbalance problem that can affect classification of incomprehensible user messages. Therefore, a decision-tree-based algorithm like XGBoost has better performance for imbalanced data. XGBoost uses classification and regression (CART) trees, which are different from other types of decision trees. For CART trees, a real score is associated with each of the leaves, which aids in interpretation. XGBoost considers the tree structure and tries to optimize the tree structure—e.g., for a given tree structure, XGBoost sums the static values in the leaves and evaluates the tree performance, while also taking the model complexity into account. Further information about using CART trees with XGBoost to generate predictions via a classification model is described at xgboost.readthedocs.io/en/stable/tutorials/model.html. In some embodiments, classification model 111 comprises a trained long short-term memory (LSTM) model that minimizes the residual error of the model. As can be appreciated, LSTM is a special kind of recurrent neural network (RNN). A common LSTM architecture is composed of a cell (the memory part of the LSTM unit) and three "regulators," usually called gates, of the flow of information inside the LSTM unit: an input gate, an output gate and a forget gate. Some variations of the LSTM unit do not have one or more of these gates or maybe have other gates. For example, gated recurrent units (GRUs) do not have an output gate. As compared with a standard RNN, an LSTM network solves the vanishing gradient problem.

Figure 4:
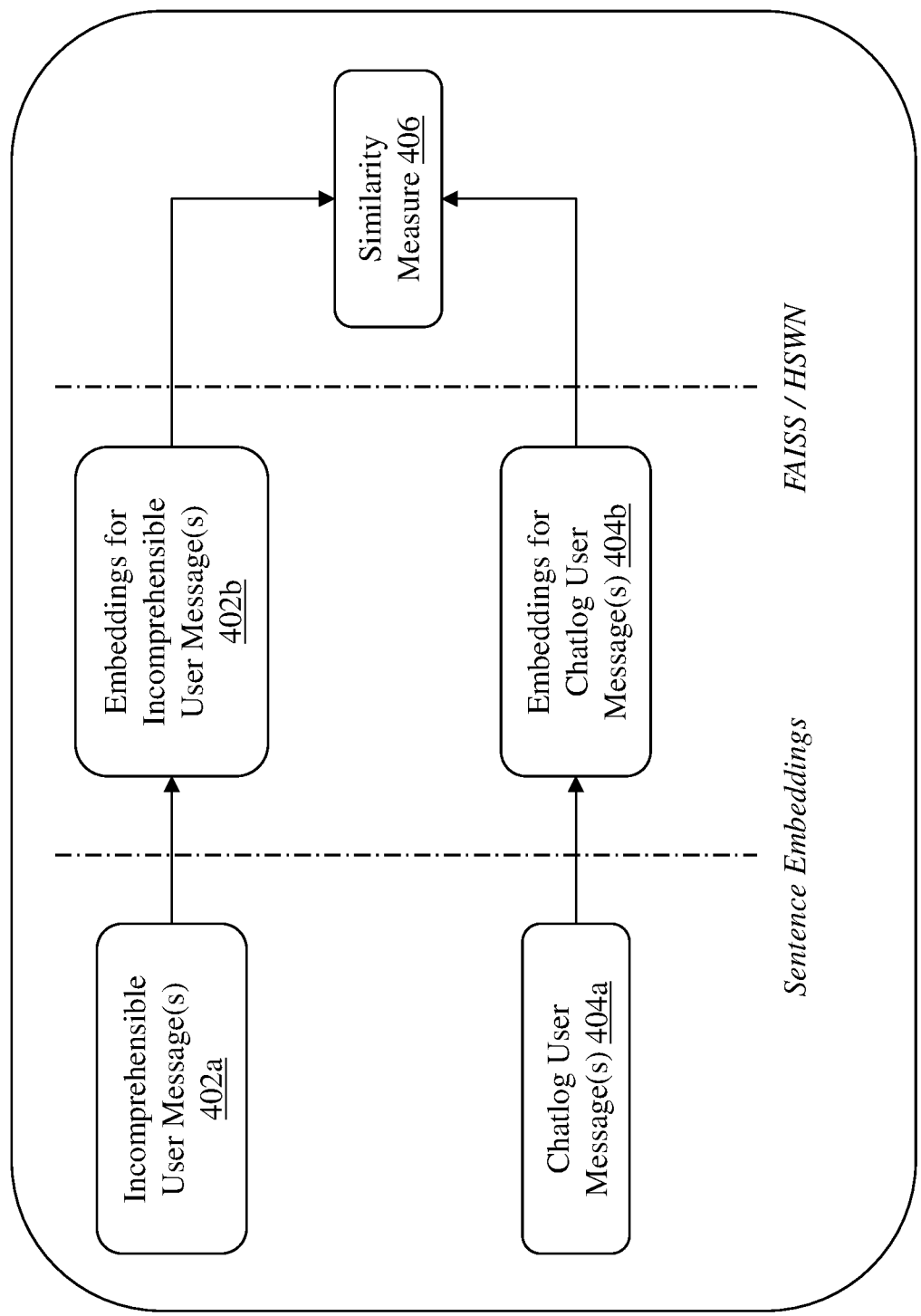
FIG. 4 is a diagram of an exemplary k-nearest neighbor architecture used to determine a similarity measure.

As a second scoring feature, similarity measure module 108h calculates (step 308) a similarity measure between each contextual embedding and one or more embeddings generated from user messages in a chat log. The goal for module 108h is to determine one or more similar user messages from a chat log of prior interactions between a client device and chatbot application 103 (where a user intent was determined) that, due to the similarity between the chatlog messages and the incomprehensible message) may provide insight into the optimal user intent for a given incomprehensible user message. To determine similarity, module 108h is configured to use a K-nearest neighbor based architecture to compare a context embedding for an incomprehensible user message and one or more context embeddings for messages in existing chatlog corpuses. FIG. 4 is a diagram of an exemplary k-nearest neighbor architecture 400 used by module 108h to determine a similarity measure. As shown in FIG. 4, incomprehensible user messages 402a are converted into contextual embeddings 402b using a deep learning embedding algorithm (e.g., Sentence-BERT) as described above. Chatlog user messages 404a are also converted into contextual embeddings 404b. Then, the embeddings for the incomprehensible user messages 402b and the embeddings for the chatlog user messages 404b are compared to determine a similarity measure 406.

However, there may be a significant number of chatlog contextual embeddings (e.g., millions or billions) due to the size of historical chatlogs. Each contextual embedding may have a large number of dimensions (e.g., 1,024). To determine a similar embedding among all chatlog corpus embeddings, module 108h might have to conduct a huge amount of comparisons and calculations. As such, the architecture 400 must be optimized to balance accuracy of the similarity measure with speed and memory cost. In some embodiments, architecture 400 is based upon the Facebook™ AI Similarity Search (FAISS) algorithm (ai.facebook.com/tools/faiss and faiss.ai). Generally, FAISS utilizes utilizing dimension compression, wrap selection, clustering buckets and graphics processing unit (GPU) resources to build a pre-organized search network, and then to search similar vectors compared with query vectors other than the most similar vectors. To execute the FAISS algorithm, in some embodiments server computing device 106 is configured with one or more dedicated GPUs used by module 108h. Further details about the FAISS algorithm are provided in J. Johnson, et al., "Billion-scale similarity search with GPUs," arXiv:1702.08734 [cs.CV], 28 Feb. 2017, available at arxiv.org/pdf/1702.08734, which is incorporated herein by reference. Module 108h determines one or more contextual embeddings for chatlog messages that are similar to the contextual embedding for the incomprehensible user message and calculates a similarity measure. Also, in some embodiments, module 108h uses a Hierarchical Navigable Small Worlds (HNSW) optimization index to speed up execution of the FAISS algorithm. Details on the HNSW index are described in Y. Malkov and D. A. Yashunin, "Efficient and robust approximate nearest neighbor search using Hierarchical Navigable Small World graphs," arXiv: 1603.09320 [cs.DS] 14 Aug. 2018, available at arxiv.org/pdf/1603.09320, which is incorporated herein by reference.

As a third scoring feature, pattern matching module 108i matches (step 310) each of the incomprehensible user messages to one or more comprehensible user messages (e.g., from chatlog corpus) using a pattern matching algorithm. In some embodiments, module 108i is configured with one or more predefined rules that operate to match certain words or phrases between the incomprehensible user message and the chatlog user message(s) to determine one or more chatlog user messages that are the most similar to the incomprehensible user message. Based on the matching step, module 108i determines user intents associated with the matching chatlog messages and assigns at least one of the user intents to the incomprehensible user message. In some embodiments, module 108i can determine a match score for the incomprehensible user message based upon the pattern matching algorithm. In one embodiment, module 108i uses a rule-based matching engine implemented in spaCy (spacy.io/usage/rule-based-matching) to perform the pattern matching.

After each of the scoring features described above have been determined by modules 108g, 108h, and 108i respectively, predicted intent generation module 108j generates (step 312) a predicted intent score for each incomprehensible user message based upon the intent classification score (from module 108g), the similarity measure (from module 108h), and the matched comprehensible user messages (from module 108i). In some embodiments, the predicted intent score is calculated using each of the intent classification score, the similarity measure, and the matched comprehensible user messages—for example, module 108j can aggregate a numeric value associated with each of the three data elements and determine a predicted intent score based upon the aggregation. In other embodiments, module 108j can use a voting procedure to determine the predicted intent score—for each incomprehensible user message, if two or more of module 108g, 108h, and 108i predict a score that corresponds to the same user intent, then module 108j can assign that user intent as the predicted or recommended intent for the incomprehensible user message. Finally, module 108j determines (step 314) one or more existing user intents based upon the predicted intent score and assigns the one or more existing user intents to the corresponding incomprehensible user message.

Once the existing user intent(s) are assigned to an incomprehensible user message by module 108j, the newly-comprehensible user message and the intents can be transmitted to chatbot application 103 for review and enhancing the capability of chatbot 103 by retraining one or more models executed by chatbot application 103 using the received data. In some circumstances, the predicted intent score generated by module 108j may not relate to any existing user intents which indicates that the incomprehensible user message may be associated with a completely new intent that chatbot 103 has not encountered before. In this circumstances, server computing device 106 can return an indicator to chatbot application 103 that the intent classification has failed. Chatbot 103 can direct the user at client computing device 102 to one or more default resources (e.g., a live call center agent) to handle the request. In addition, research can be performed on the incomprehensible user message to determine whether an intent can be manually learned and used to re-train the chatbot 103 models.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), AS IP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A computer system for enhancing chatbot recognition of user intent through graph analysis, the system comprising a computing device having a memory that stores computer-executable instructions and a processor that executes the computer-executable instructions to:
    classify each of a plurality of user messages associated with a chat session between a user of a remote computing device and a chatbot application as either comprehensible user messages that are mapped to a user intent or incomprehensible utterances that are not mapped to a user intent;
    arrange the comprehensible user messages into a first plurality of clusters and arrange the incomprehensible user messages into a second plurality of clusters;
    generate a first sub-graph data structure for each cluster in the first plurality of clusters and generate a second sub-graph data structure for each cluster in the second plurality of clusters;
    calculate a graph kernel matrix using the first sub-graph data structures and the second sub-graph data structures;
    train a classification model using the graph kernel matrix, the trained classification model configured to predict an intent identifier for an input graph kernel matrix; and
    execute the trained classification model using the graph kernel matrix as input to generate a predicted intent identifier for one or more of the incomprehensible user messages.

2. The system of claim 1, wherein classifying each of the plurality of user messages as either a comprehensible user message or an incomprehensible user message comprises, for each user message:
    determining whether the user message can be mapped to an existing user intent;
    classifying the user message as a comprehensible user message when the user message can be mapped to an existing user intent; and
    classifying the user message as an incomprehensible user message when the user message cannot be mapped to an existing user intent.

3. The system of claim 1, wherein arranging the comprehensible user messages into a first plurality of clusters and arranging the incomprehensible user messages into a second plurality of clusters comprises:
    preprocessing the comprehensible user messages and the incomprehensible user messages;

transforming each comprehensible user message into a multidimensional vector and transforming each incomprehensible user message into a multidimensional vector;

assigning each comprehensible user message vector to a cluster of the first plurality of clusters based upon all comprehensible user messages that are mapped to a same intent as the comprehensible user message; and assigning the incomprehensible user message vectors to a cluster of the second plurality of user messages.

4. The system of claim 1, wherein each first sub-graph data structure and each second sub-graph structure is based upon a plurality of keywords from the user messages associated with the corresponding cluster.

5. The system of claim 1, wherein the classification model comprises a support vector machine (SVM).

6. The system of claim 1, wherein the computing device determines an existing user intent associated with the predicted intent identifier and assigns the determined user intent to the corresponding incomprehensible user message.

7. A computerized method of enhancing chatbot recognition of user intent through graph analysis, the method comprising:

classifying, by a computing device, each of a plurality of user messages associated with a chat session between a user of a remote computing device and a chatbot application as either comprehensible user messages that are mapped to a user intent or incomprehensible utterances that are not mapped to a user intent;

arranging, by the computing device, the comprehensible user messages into a first plurality of clusters and arranging the incomprehensible user messages into a second plurality of clusters;

generating, by the computing device, a first sub-graph data structure for each cluster in the first plurality of clusters and generating a second sub-graph data structure for each cluster in the second plurality of clusters;

calculating, by the computing device, a graph kernel matrix using the sub-graph data structures generated from the first plurality of clusters and the second plurality of clusters;

training, by the computing device, a classification model using the graph kernel matrix, the trained classification model configured to predict an intent identifier for an input graph kernel matrix; and executing, by the computing device, the trained classification model using the graph kernel matrix as input to generate a predicted intent identifier for one or more of the incomprehensible user messages.

8. The method of claim 7, wherein classifying each of the plurality of user messages as either a comprehensible user message or an incomprehensible user message comprises, for each user message:

determining whether the user message can be mapped to an existing user intent;

classifying the user message as a comprehensible user message when the user message can be mapped to an existing user intent; and classifying the user message as an incomprehensible user message when the user message cannot be mapped to an existing user intent.

9. The method of claim 7, wherein arranging the comprehensible user messages into a first plurality of clusters and arranging the incomprehensible user messages into a second plurality of clusters comprises:

preprocessing the comprehensible user messages and the incomprehensible user messages;

transforming each comprehensible user message into a multidimensional vector and transforming each incomprehensible user message into a multidimensional vector;

assigning each comprehensible user message vector to a cluster of the first plurality of clusters based upon all comprehensible user messages that are mapped to a same intent as the comprehensible user message; and assigning the incomprehensible user message vectors to a cluster of the second plurality of user messages.

10. The method of claim 7, wherein each first sub-graph data structure and each second sub-graph structure is based upon a plurality of keywords from the user messages associated with the corresponding cluster.

11. The method of claim 7, wherein the classification model comprises a support vector machine (SVM).

12. The method of claim 7, wherein the computing device determines an existing user intent associated with the predicted intent identifier and assigns the determined user intent to the corresponding incomprehensible user message.

13. A computer system for enhancing chatbot recognition of user intent through graph analysis, the system comprising a computing device having a memory that stores computer-executable instructions and a processor that executes the computer-executable instructions to:

classify each of a plurality of user messages associated with a chat session between a user of a remote computing device and a chatbot application as either comprehensible user messages that are mapped to a user intent or incomprehensible utterances that are not mapped to a user intent;

generate a contextual embedding for each of the plurality of user messages;

determine an intent classification score for each contextual embedding using a classification model;

calculate a similarity measure between each contextual embedding and one or more embeddings generated from user messages in a chat log;

match each of the incomprehensible user messages to one or more comprehensible user messages using a pattern matching algorithm;

generate a predicted intent score for each incomprehensible user message based upon the intent classification score, the similarity measure, and the matched comprehensible user messages; and determine one or more existing user intents based upon the predicted intent score and assign the one or more existing user intents to the corresponding incomprehensible user message.

14. The system of claim 13, wherein generating a contextual embedding for each of the plurality of user messages comprises executing a contextual embedding model on each of the plurality of user messages to generate a multidimensional vector comprising one or more features of the user message.

15. The system of claim 14, wherein the contextual embedding model comprises a bidirectional encoder representations from transformers (BERT) model.

16. The system of claim 13, wherein the computing device reduces the number of dimensions in the contextual embedding prior to determining the intent classification score.

17. The system of claim 13, wherein the computing device clusters the contextual embeddings and determines the intent classification score for each contextual embedding cluster.

18. The system of claim 13, wherein the similarity measure between each contextual embedding and the one or more embeddings generated from the user messages in the chat log is determined using a nearest neighbor algorithm.

19. A computerized method of enhancing chatbot recognition of user intent through graph analysis, the method comprising:

classifying, by a computing device, each of a plurality of user messages associated with a chat session between a user of a remote computing device and a chatbot application as either comprehensible user messages that are mapped to a user intent or incomprehensible utterances that are not mapped to a user intent;

generating, by the computing device, a contextual embedding for each of the plurality of user messages;

determining, by the computing device, an intent classification score for each contextual embedding using a classification model;

calculating, by the computing device, a similarity measure between each contextual embedding and one or more embeddings generated from user messages in a chat log;

matching, by the computing device, each of the incomprehensible user messages to one or more comprehensible user messages using a pattern matching algorithm;

generating, by the computing device, a predicted intent score for each incomprehensible user message based upon the intent classification score, the similarity measure, and the matched comprehensible user messages; and determining, by the computing device, one or more existing user intents based upon the predicted intent score and assigning the one or more existing user intents to the corresponding incomprehensible user message.

20. The method of claim 19, wherein generating a contextual embedding for each of the plurality of user messages comprises executing a contextual embedding model on each of the plurality of user messages to generate a multidimensional vector comprising one or more features of the user message.

21. The method of claim 19, wherein the contextual embedding model comprises a bidirectional encoder representations from transformers (BERT) model.

22. The method of claim 19, wherein the computing device reduces the number of dimensions in the contextual embedding prior to determining the intent classification score.

23. The method of claim 19, wherein the computing device clusters the contextual embeddings and determines the intent classification score for each contextual embedding cluster.

24. The method of claim 19, wherein the similarity measure between each contextual embedding and the one or more embeddings generated from the user messages in the chat log is determined using a nearest neighbor algorithm.

* * * * *